(12) United States Patent
Yepez et al.

(10) Patent No.: US 10,717,903 B2
(45) Date of Patent: Jul. 21, 2020

(54) POLYSTYRENE ADHESIVE

(71) Applicant: BLOCKHEAD INNOVATIONS, LLC, St. Louis, MO (US)

(72) Inventors: Michelle Yepez, St. Louis, MO (US); Sindhu Bala, St. Louis, MO (US); Ellie Englund, St. Louis, MO (US); Julianna Jones, St. Louis, MO (US); Sydney Gralike, St. Louis, MO (US); Reagan Mattison, St. Louis, MO (US); Caroline Sluss, St. Louis, MO (US); Christina Yepez, St. Louis, MO (US); Claire Sackman, St. Louis, MO (US)

(73) Assignee: Blockhead Innovations, LLC, St. Louis, MO (US)

( * ) Notice: Subject to any disclaimer, the term of this patent is extended or adjusted under 35 U.S.C. 154(b) by 0 days.

(21) Appl. No.: 16/173,510

(22) Filed: Oct. 29, 2018

(65) Prior Publication Data
US 2019/0127613 A1    May 2, 2019

Related U.S. Application Data

(60) Provisional application No. 62/578,163, filed on Oct. 27, 2017.

(51) Int. Cl.
*C09J 125/06* (2006.01)
*C08L 29/04* (2006.01)
*C08L 71/02* (2006.01)
*C08K 5/01* (2006.01)
*C08L 3/02* (2006.01)

(52) U.S. Cl.
CPC ............... *C09J 125/06* (2013.01); *C08K 5/01* (2013.01); *C08L 3/02* (2013.01); *C08L 29/04* (2013.01); *C08L 71/02* (2013.01)

(58) Field of Classification Search
CPC .................................................... C09J 125/06
See application file for complete search history.

(56) References Cited

U.S. PATENT DOCUMENTS

| | | | |
|---|---|---|---|
| 3,563,851 A | 2/1971 | Armour et al. | |
| 3,668,166 A | 6/1972 | Kane et al. | |
| 7,321,003 B2 | 1/2008 | Katz et al. | |
| 2014/0303268 A1* | 10/2014 | Hearon | C08J 11/04 521/47 |

FOREIGN PATENT DOCUMENTS

| | | | | |
|---|---|---|---|---|
| WO | WO-9424194 A1 * | 10/1994 | ............... | C08J 3/092 |
| WO | 2007052366 | 5/2007 | | |

* cited by examiner

*Primary Examiner* — Daniel H Lee
(74) *Attorney, Agent, or Firm* — Polsinelli PC

(57) ABSTRACT

The present disclosure relates to a composition and methods of making an adhesive from polystyrene, a terpene, and water.

12 Claims, 3 Drawing Sheets

POLYSTYRENE ADHESIVE

CROSS REFERENCE TO A RELATED APPLICATION

This application claims priority from U.S. Provisional Application Ser. No. 62/578,163 filed on Oct. 27, 2017, the disclosure of which is hereby incorporated by reference in its entirety.

FIELD OF THE INVENTION

This disclosure relates to methods of making an adhesive.

BACKGROUND OF THE INVENTION

Polystyrene is a major component of our landfills. So far, there has not been a way for families or companies to reduce Styrofoam®, or to recycle polystyrene into a usable product. The result is that this ubiquitous material takes up significant space in family trash bins and landfills, and will remain in our environment for more than 500 years.

There is a need to reduce the amount of polystyrene in our landfills, by finding alternative uses for the polystyrene.

SUMMARY OF THE INVENTION

Disclosed herein are methods of making an adhesive composition using polystyrene.

In an aspect the adhesive composition may include, but is not limited to, polystyrene, a terpene, and water. In various aspects, the terpene may be D-limonene, dipentene, or related terpenes. The composition may include about 20-35 w/v % of polystyrene. The composition may include about 46 w/v % of the terpene, such as D-limonene or dipentene. The composition may include about 15-17 w/v % of water. The composition may further include about 3-4.5 w/v % of a polysorbate. The polysorbate may be polysorbate 80, polysorbate 20, or combinations thereof. Additionally, the composition may include about 1-3 w/v % of polyvinyl alcohol. Alternatively, composition may also include about 2-5 w/v % of corn starch.

In another aspect, a method of making an adhesive composition may include, but is not limited to, mixing polystyrene, a terpene, and water. In various aspects, the terpene may be D-limonene, dipentene, or related terpenes. The method may include mixing the terpene, water, and a polysorbate to form an emulsion, adding polystyrene to the mixture, and stirring the mixture to form a uniform consistency. In another aspect, the method may further include adding a second polysorbate to the mixture. In one aspect, the method may include mixing D-limonene, dipentene, or related terpenes with polysorbate 80, mixing water with polysorbate 20, combining and mixing the two mixtures then adding polystyrene to the mixture, and stirring the mixture to form a uniform consistency. The method may further include adding polyvinyl alcohol to the terpene, water, and polysorbate to form an emulsion.

Other aspects and iterations of the invention are described more thoroughly below.

BRIEF DESCRIPTION OF THE FIGURES

The description will be more fully understood with reference to the following figures, which are presented as various examples of the disclosure and should not be construed as a complete recitation of the scope of the disclosure.

DETAILED DESCRIPTION

Figure 1:
FIG. 1 is a representative picture of the adhesive in storage bottles.
Figure 2:
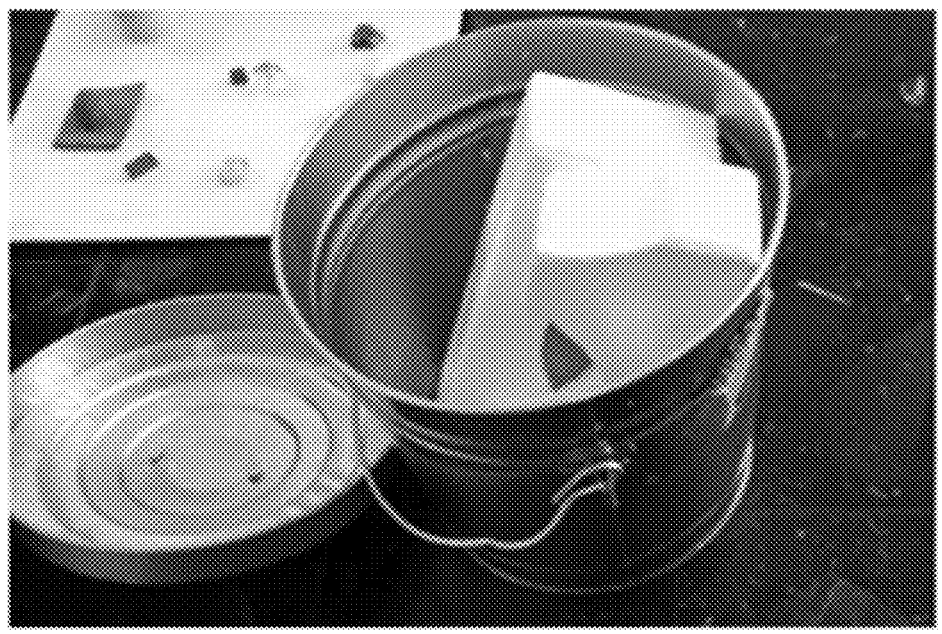
FIG. 2 illustrates the process of adding the ingredients of the glue.
Figure 3:
FIG. 3 is a representative picture of a kit to reduce polystyrene for homes or businesses.

The present disclosure provides a composition and method for making an adhesive composition using polystyrene. In an aspect, the adhesive composition includes polystyrene, a terpene, and water. In various aspects, the terpene may be D-limonene, dipentene, or related terpenes. The composition may also include one or more polysorbate. An advantage of the compositions disclosed herein is that the composition is stickier and dries quicker other polystyrene based adhesives. In addition, the compositions disclosed herein may be stronger and more durable that other polystyrene based adhesives. Other aspects of the compositions and methods of the present disclosure are described more thoroughly below.

Several definitions that apply throughout this disclosure will now be presented. As used herein, "about" refers to numeric values, including whole numbers, fractions, percentages, etc., whether or not explicitly indicated. The term "about" generally refers to a range of numerical values, for instance, ±0.5-1%, +1-5% or ±5-10% of the recited value, that one would consider equivalent to the recited value, for example, having the same function or result.

The term "comprising" means "including, but not necessarily limited to"; it specifically indicates open-ended inclusion or membership in a so-described combination, group, series and the like. The terms "comprising" and "including" as used herein are inclusive and/or open-ended and do not exclude additional, unrecited elements or method processes. The term "consisting essentially of" is more limiting than "comprising" but not as restrictive as "consisting of." Specifically, the term "consisting essentially of" limits membership to the specified materials or steps and those that do not materially affect the essential characteristics of the claimed invention.

The percentages of the ingredients of the composition and are typically expressed as a weight percent of the total volume of the composition (w/v).

The concentrations of the components can be changed based on use of the composition. In an aspect the composition may be used to adhere or bind two materials. Non-limiting examples of the types of materials that are adhered or bound include craft products including paper, wood, cork, pipe cleaners, plastics, acrylic, felt and fabric. In an aspect the composition may be used to bind plastics in the 3D printing industry. In an alternate aspect, the composition may also be used to provide a coating over surfaces of materials to provide water resistance.

Polystyrene provides the adhesive property for the composition. The terpene, such as D-limonene or dipentene, dissolves the polystyrene, and water may increase the stickiness of the polystyrene-D-limonene mixture. In some aspects, a polysorbate, such as polysorbate 80 or polysorbate 20, may emulsify the polystyrene-terpene mixture.

Surprisingly, adding water to a solution of polystyrene and the terpene may result in a solution that is stickier and dries quicker than a solution of a terpene and polystyrene alone. Without being limited to a particular theory, the water may allow the polystyrene fibers to separate and therefore create a stronger bond than just a D-limonene and polystyrene solution. In an aspect, water in the composition may allow for faster drying than an oil based mixture.

In an aspect, water in the composition may keep the composition sticky and usable as an adhesive for a period of time of at least about 12 months. The composition may maintain stickiness and usability for at least about 6 months, at least about 12 months, or at least about 18 months.

The composition may also create a tacky bond quicker than some already available products. In an aspect, the composition may also provide for water repulsion. For example, the bond created by the composition may be able to withstand a certain amount of water and not break apart.

In another aspect, the composition may include an emulsifier. Non-limiting examples of emulsifiers that may be added to the composition are polysorbate 80, polysorbate 20, cetereath 20, and oleth 20. In a preferred aspect, a polysorbate, such as polysorbate 80, polysorbate 20, or combinations thereof, may be added to the composition to increase the emulsification of the product. In the absence of the polysorbate, the mixture may separate into the polystyrene/terpene mixture and water at the bottom. Polysorbate 80 may also allow the mixture to stay more uniform.

In an aspect, polyvinyl alcohol may be added to the composition. Polyvinyl alcohol may further decrease drying time of the composition and increase adhesion. In another aspect, corn starch may be added to the composition. Corn starch may decrease drying time of the composition and increase adhesion.

The composition may include polystyrene in an amount of about 20% to about 45% of the total composition. In various aspects, the amount of polystyrene in the composition may range from about 20% to about 25%, from about 25% to about 30%, from about 30% to about 35%, from about 35% to about 40%, and about 40% to about 45%. In at aspect, the amount of polystyrene in the composition may be at least 20%. In at aspect, the amount of polystyrene in the composition may be at least 25%. In at aspect, the amount of polystyrene in the composition may be at least 30%. In one aspect, when a thicker adhesive is required, the polystyrene content of the composition may be greater than 40%. In another aspect, when a lighter adhesive may be required, the polystyrene content may be less than 40%. The concentration of polystyrene may also change the tackiness of the composition. The time for the composition to be tacky to the touch may range from about 10 minutes to about 60 minutes.

In an aspect, the adhesive composition may further include a terpene in an amount ranging from about 40% to about 55%. In an aspect, the adhesive composition includes at least about 40% of a terpene. In an aspect, the adhesive composition includes at least about 45% of a terpene. In an aspect, the adhesive composition includes at least about 50% of a terpene. In an aspect, the adhesive composition includes at least about 55% of a terpene. In an aspect, the adhesive composition includes less than about 50% of a terpene. In some aspects, the terpene is selected from D-limonene, dipentene, or a related terpene. In one aspect, the composition includes D-limonene in an amount of about 46%.

In various aspects, the composition may include about 10% to about 20% of water. The composition may include about 15% to about 18% of water. In an aspect, the composition includes at least about 10% water. In an aspect, the composition includes at least about 15% water. In an aspect, the composition includes at least about 17% water. In an aspect, the composition includes at least about 18% water. In an aspect, the composition includes less than about 20% water. The concentration of water in the composition may impact the drying time of the composition.

The composition may further include about 2% to about 4.5% of a polysorbate. In an aspect, the composition may include at least about 2% of a polysorbate. In an aspect, the composition may include at least about 3% of a polysorbate. In an aspect, the composition may include at least about 4% of a polysorbate. In an aspect, the composition may include less than about 4.5% of a polysorbate. In an aspect, the composition may include 2.8% of a polysorbate. In some aspects, the polysorbate may be a combination of more than one polysorbate. For example, the polysorbate may be polysorbate 80, polysorbate 20, or combinations thereof. In some aspects, the composition may include about 2.6% to about 3% of polysorbate 80 and about 0% to about 1.5% polysorbate 20.

Additionally, the composition may include about 1% to about 3% of polyvinyl alcohol. In an aspect, the composition may include at least about 1% polyvinyl alcohol. In an aspect, the composition may include at least about 2% polyvinyl alcohol. In an aspect, the composition may include at least about 3% polyvinyl alcohol. Alternatively, the composition may also include about 2% to about 5% of corn starch. In an aspect, the composition may include at least about 2% corn starch. In an aspect, the composition may include at least about 3% corn starch. In an aspect, the composition may include at least about 4% corn starch. In an aspect, the composition may include at least about 5% corn starch. The concentration of the polyvinyl alcohol or the corn starch in the composition may impact the drying time of the composition.

Further provided herein is a method of making an adhesive composition including, but not limited to, polystyrene, a terpene, and water. The method may include mixing the terpene, water, and a polysorbate to form an emulsion, adding polystyrene to the mixture, and stirring the mixture to form a uniform consistency. The method may further comprise adding polyvinyl alcohol and/or corn starch to the terpene, water, and polysorbate mixture to form an emulsion. In an aspect, the polysorbate may be polysorbate 80, polysorbate 20, or combinations thereof.

In an aspect, the method may include forming an emulsion by mixing a terpene in an amount ranging from about 40% to about 55% with about 10% to about 20% water and about 2% to about 4.5% of polysorbate, relative to the total composition. In one aspect, the amount of terpene in the composition may be about 46 to about 54.2%, the water may be about 15.3% to about 18.1%, and the polysorbate may be about 2.8% to about 4.5 of the composition. The terpene may be D-limonene or dipentene, in one aspect. The polysorbate may be polysorbate 80, polysorbate 20, or combinations thereof, in one aspect. Additionally, the method may further include adding about 1% to about 3% of polyvinyl alcohol to the emulsion. Alternatively, the method may also include adding about 2% to about 5% of corn starch to the emulsion.

The method may include adding polystyrene in an amount of about 20% to about 45% of the total composition to the emulsion. In various aspects, the amount of polystyrene in the composition may range from about 20% to about 25%, from about 25% to about 30%, from about 30% to about 35%, from about 35% to about 40%, and about 40% to about 45%.

Further provided herein is a method of using the composition to bind or adhere two or more materials. In an aspect the composition may be used to adhere or bind two materials. Non-limiting examples of the types of materials that are adhered or bound include craft products including paper, wood, cork, pipe cleaners, plastics, acrylic, felt and fabric. In an aspect the composition may be used to bind plastics in 3D printing. In an alternate aspect, the composition may also be used to provide a coating over surfaces of materials to provide water resistance.

The drying time for the composition to bind two or more materials may range from about 10 minutes to about 20 minutes. Decreasing concentrations of polystyrene may lead to increased drying time, while increasing concentrations of water may lead to decreased drying time. Heat may also be applied to the composition to decrease drying time.

EXAMPLES

The following examples are included to demonstrate various embodiments of the present disclosure. It should be appreciated by those of skill in the art that the techniques disclosed in the examples that follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1: Formulation 1

An adhesive composition of formulation 1 includes polystyrene, D-limonene, water, polysorbate 80, and polysorbate 20. Polystyrene (23.2%-34.8%) was dissolved in a solution of a terpene (D-limonene, dipentene, or related terpenes) (54.2%-46%), water (15.3%-18.1%), polysorbate 80 (2.6%-3%), and polysorbate 20 (1.3%-1.5%) mixture as seen in Table 1. The concentrations of the components can be changed based on use of the product. For example formulation 1 may include 32% polystyrene, 48% d-limoneneor dipentene, 16% water, 2.7% polysorbate 80, and 1.3% polysorbate 20. Polystyrene added the adhesive property. D-limonene or dipentene dissolved polystyrene. Water increased the stickiness of the polystyrene-D-limonene mixture. Polysorbate 80 and polysorbate 20 emulsified the mixture.
Process of Making Formulation 1

A specified amount of the terpene, water and polysorbate 80 were mixed together to form a first mixture. Polysorbate 20 and water were mixed to form a second mixture. The first and second mixtures were combined to form an emulsion. A specified amount of polystyrene was added to the emulsion. The mixture was stirred until a uniform mixture was achieved.

Example 2: Formulation 2

An adhesive composition of formulation 2 includes polystyrene, a terpene (D-limonene or dipentene), water, polysorbate 80, polysorbate 20, and polyvinyl alcohol. Polystyrene (26-35%) was dissolved in a polyvinyl alcohol (1-3%), water (17%), polysorbate 80 (2.8%), polysorbate 20 (2.8%), and the terpene (46%) solution, as seen in Table 1. The concentrations can be changed depending on the final use of the product. Polystyrene added the adhesive property. D-limonene or dipentene dissolved polystyrene. Water increased the stickiness of the polystyrene/terpene mixture. Polysorbate 80 and polysorbate 20 emulsified the product. Polyvinyl alcohol increases tensile strength and decreases drying time.
Process of Making Formulation 2

A specified amount of polyvinyl alcohol was dissolved in a specified amount of 120° F. water. A specified amount of polysorbate 20 is added to the previous mixture. A specified amount of the terpene (D-limonene or dipentene) was combined with polysorbate 80 and added to the water/polyvinyl alcohol/polysorbate 20 solution. The mixture then was cooled to room temperature. A specified weight of polystyrene was then dissolved in the above mixture. The mixture was stirred for 30 minutes to create a uniform mixture. The mixture was allowed to rest for 1-2 hours and then stirred again to further incorporate to a uniform mixture.

Example 3: Formulation 3

An adhesive composition of formulation 3 includes polystyrene (26-35%), D-limonene (46%), water (17%), polysorbate 80 (2.8%) and cornstarch (2-5%), as seen in Table 1. Polystyrene was dissolved in an adjustable concentration of D-limonene, water, polysorbate 80 and cornstarch depending on the final use of the product. Polystyrene added the adhesive property. D-limonene dissolved polystyrene. Water increased the stickiness of the polystyrene/D-limonene mixture. Polysorbate 80 emulsified the product Corn starch added adhesion and decreased drying time and allowed for stronger bonding.
Process of Making Formulation 3

A specified amount of cornstarch is added to water and heated to 120° F. A specified amount of polysorbate 80 was added to the previous mixture. A specified amount of D-limonene was added to the water/corn starch/polysorbate 80 solution. The mixture was then cooled to room temperature. A specified weight of polystyrene was then dissolved in the above mixture. The mixture was stirred for 30 minutes create a uniform mixture. The mixture was allowed to rest for 1-2 hours and then stirred again to further incorporate to a uniform mixture.

TABLE 1

Formulations 1-3

|  | Polystyrene (w/v %) | Terpene (D-Limonene or dipentene) (w/v %) | Water (w/v %) | Polysorbate (w/v %) | Polyvinyl alcohol (w/v %) | Corn Starch (w/v %) |
|---|---|---|---|---|---|---|
| Formulation 1 | 23.2-34.8 | 54.2-46 | 15.3-18.1 | 2.6-3 (polysorbate 80) 1.3-1.5 (polysorbate 20) | 0 | 0 |
| Formulation 2 | 26-35 | 46 | 17 | 2.8 (polysorbate 80) 2.8 (polysorbate 20) | 1-3 | 0 |
| Formulation 3 | 26-35 | 46 | 17 | 2.8 (polysorbate 80) | 0 | 2-5 |

Example 4: Testing Adhesive Formulations

A solution of polystyrene and D-limonene was tested initially to determine the solution's adhesive properties. It was found that the solution took over 24 hours to dry depending on the thickness of the application. The solution was oily and if used on a paper product, it left an oily stain after drying. The amount of time for the product to create a tacky bond was excessive compared to current products.

It was surprisingly found that by adding water to the solution, the resulting solution was stickier and dried quicker than the solution of D-limonene and polystyrene alone. Further testing resulted in the observation that the water allowed the polystyrene fibers to separate and therefore create a stronger bond than just a D-limonene and polystyrene solution. Because the water broke apart the D-limonene and polystyrene mixture, it allowed for faster drying than an oil based mixture.

It was found that the product created a tacky bond quicker than some already available products. Another advantage of the product relates to water repulsion. The bond is able to withstand a certain amount of water and not break apart. Because of the properties of the polystyrene, the adhesive will dry to a plastic film.

It was found that over time, that the solutions of D-limonene, polystyrene and water remained a more viable adhesive than just D-limonene and polystyrene. It was observed that D-limonene and polystyrene will become gel like and rubbery after 6 to 12 months. The addition of water when making the adhesive keeps the solution sticky and usable for at least 12 months.

Polysorbate 80 was added to the mixture to increase the emulsification of the product. In the absence of polysorbate 80, the mixture separated into the polystyrene/D-limonene mixture and water at the bottom. Polysorbate 80 also allowed the mixture to stay more uniform. Polysorbate 20 was added to further enhance the emulsion from both the oil and the water aspect.

Polyvinyl alcohol was added to further decrease drying time of the product and increase adhesion. Corn starch was tried as an alternative to polyvinyl alcohol to determine its properties. We found that the dissolution time of the polystyrene was decreased in this mixture. This mixture has the same properties as the mixture with polyvinyl alcohol.

Example 5: Testing Drying Times

Various compositions containing polystyrene, d-limonene were tested to determine the drying times. Decreasing polystyrene and increasing water in the composition, increased the drying time. The drying times for 35% polystyrene, 31% polystyrene, 27% polystyrene, were 11 minutes, 13 minutes, and 19 minutes, respectively. In addition, compositions with 40% polystyrene were tacky in 10 minutes, and compositions of 46% polystyrene were tacky in 52 minutes.

Heat decreased the drying time. The composition dried quicker both in warmer surrounding temperatures and when heat was directly applied to surfaces for example by using a hot clothing iron.

Having described several examples, it will be recognized by those skilled in the art that various modifications, alternative constructions, and equivalents can be used without departing from the spirit of the invention. Additionally, a number of well-known processes and elements have not been described in order to avoid unnecessarily obscuring the present invention. Accordingly, the above description should not be taken as limiting the scope of the invention.

Those skilled in the art will appreciate that the presently disclosed examples teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. An adhesive composition comprising 23.2-35 w/v % polystyrene, 46-54.2 w/v % of a terpene, and 15.3-18.1 w/v % water, wherein the terpene is selected from the group consisting of D-limonene and dipentene.

2. The composition of claim 1, wherein the composition further comprises about 2 w/v % to about 4.5 w/v % of a polysorbate selected from the group consisting of polysorbate 80, polysorbate 20, or combinations thereof.

3. The composition of claim 2, wherein the composition comprises at least about 2 w/v % of polysorbate 80 and at least about 1 w/v % polysorbate 20.

4. The composition of claim 1, wherein the composition further comprises polyvinyl alcohol.

5. The composition of claim 4, wherein the composition comprises about 1 w/v % to about 3 w/v % of polyvinyl alcohol.

6. The composition of claim 1, wherein the composition further comprises corn starch.

7. The composition of claim 6, wherein the composition comprises 2 w/v % to about 5 w/v % of corn starch.

8. A method of making an adhesive using polystyrene, the method comprising:
   a. mixing a terpene, water, and a polysorbate to form an emulsion,
   b. adding polystyrene to the emulsion to form a mixture, and
   c. stirring the mixture to form a composition with uniform consistency,
   wherein the composition comprises 23.2-35 w/v % polystyrene, 46-54.2 w/v % of a terpene, and 15.3-18.1 w/v % water, and wherein the terpene is selected from the group consisting of D-limonene and dipentene.

9. The method of claim 8, wherein the composition comprises about 2 w/v % to about 4.5 w/v % of the polysorbate.

10. The method of claim 9, wherein the composition comprises at least about 2 w/v % of polysorbate 80 and at least about 1 w/v % polysorbate 20.

11. The method of claim 8, wherein the method further comprises adding polyvinyl alcohol to the terpene, water, and the polysorbate to form an emulsion, wherein the polyvinyl alcohol is present in an amount of about 1 w/v % to about 3 w/v % of the composition.

12. The method of claim 8, wherein the method further comprises adding corn starch to the terpene, water, and the polysorbate to form an emulsion, wherein the corn starch is present in an amount of about 2 w/v % to about 5 w/v % of the composition.

* * * * *